(12) United States Patent
Miura et al.

(10) Patent No.: US 6,481,207 B2
(45) Date of Patent: Nov. 19, 2002

(54) SINGLE-PIPE CYLINDER TYPE REFORMER AND METHOD OF OPERATING THE SAME

(75) Inventors: Toshiyasu Miura, Tokyo (JP); Yoshinori Shirasaki, Tokyo (JP)

(73) Assignee: Tokyo Gas Co., LTD, Tokyo (JP)

( * ) Notice: Subject to any disclaimer, the term of this patent is extended or adjusted under 35 U.S.C. 154(b) by 0 days.

(21) Appl. No.: 09/750,490

(22) Filed: Dec. 20, 2000

(65) Prior Publication Data

US 2001/0029735 A1 Oct. 18, 2001

Related U.S. Application Data

(63) Continuation of application No. PCT/JP00/02581, filed on Apr. 20, 2000, now abandoned.

(51) Int. Cl.⁷ .................................................. F01K 1/00
(52) U.S. Cl. ......................... 60/670; 422/197; 422/198; 422/211
(58) Field of Search ................... 60/670, 643; 422/196, 422/197, 198, 211

(56) References Cited

U.S. PATENT DOCUMENTS

| | | | |
|---|---|---|---|
| 1,478,550 A | * | 12/1923 | Casale |
| 4,692,306 A | | 9/1987 | Minet |
| 5,164,163 A | * | 11/1992 | Aoki et al. ................. 422/190 |
| 5,226,928 A | * | 7/1993 | Makabe et al. ................ 48/94 |

FOREIGN PATENT DOCUMENTS

| | | |
|---|---|---|
| JP | 45736/1989 | 3/1989 |
| JP | 7-240224 | 9/1995 |
| JP | 7-291603 | 11/1995 |
| JP | 9-278402 | 10/1997 |
| JP | 10-167701 | 6/1998 |

* cited by examiner

*Primary Examiner*—Hoang Nguyen
(74) *Attorney, Agent, or Firm*—Townsend and Townsend and Crew LLP

(57) ABSTRACT

A single-pipe cylinder type reformer for manufacturing a hydrogen-rich reformed gas by steam-reforming a hydrocarbon-based crude fuel such as town gas, natural gas, or LPG or an alcohol and a reformer used with a polymer electrolyte fuel cell. The reformer has an upright outer circular cylinder, a circular cylinder, radially spaced, concentrically inside the outer cylinder, a circular intermediate cylinder concentrically located between the outer and inner cylinders, and a circular radiation cylinder concentrically located inside the inner cylinder. A burner is fixed to one end portion of the reformer and is located in the center of the radiation cylinder. A plurality of laminar annular flows including a reforming catalyst are formed between the inner and intermediate cylinders and between the intermediate and outer cylinders. End portions of the outer and inner cylinders located opposite to where the burner is fixed are sealed with different cover plates that form a double-bottom structure.

25 Claims, 7 Drawing Sheets

SINGLE-PIPE CYLINDER TYPE REFORMER AND METHOD OF OPERATING THE SAME

This application is a continuation of Application PCT/JP00/02581, filed Apr. 20, 2000, now abandoned.

BACKGROUND OF THE INVENTION

1. Field of the Invention

The present invention relates to a single-pipe cylinder type reformer for manufacturing a hydrogen-rich reformed gas by steam-reforming a hydrocarbon-based crude fuel such as town gas, natural gas, or LPG or an alcohol and, more particularly, to a reformer used in combination with a polymer electrolyte fuel cell.

2. Description of the Prior Art

A reformer is an apparatus for producing a (hydrogen-rich) reformed gas having a high hydrogen concentration by steam-reforming a hydrocarbon-based crude fuel such as town gas, natural gas, and/or LPG or an alcohol. This apparatus is widely used to produce hydrogen used in the process of manufacturing optical fibers or semiconductors and for fuel cells and the like.

In a case of methane, the reforming reaction in the reformer is expressed as:

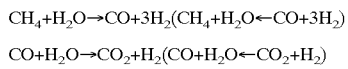

$$CH_4 + H_2O \rightarrow CO + 3H_2 (CH_4 + H_2O \leftarrow CO + 3H_2)$$

$$CO + H_2O \rightarrow CO_2 + H_2 (CO + H_2O \leftarrow CO_2 + H_2)$$

The steam reforming reaction caused by the reformer is an endothermic reaction, and hence heating is required to sustain the reaction. In general, a combustion unit such as a burner is provided for the reformer, and heating is performed by burning surplus hydrogen from a reformation material gas or fuel cell. As a reformer for producing a relatively small amount of hydrogen, a single-pipe cylinder type reformer like the one disclosed in Japanese Unexamined Patent Publication No. No. 11-11901 is known. This single-pipe cylinder type reformer is configured to have a heating means such as a burner in a cylindrical vessel incorporating a catalyst layer between two cylinders so as to heat the catalyst layer with the heating means and steam-reform a reformation material gas passed through the catalyst layer.

FIG. 1 is a longitudinal sectional view showing the schematic arrangement of a conventional single-pipe cylinder type reformer.

In the single-pipe cylinder type reformer shown in FIG. 1, an upright elongated outer cylinder 1 having a circular cross-section, a circular inner cylinder 3 located inside the outer cylinder 1, an intermediate cylinder 2 located inside the outer cylinder 1 to surround the inner cylinder 3 at a predetermined distance therefrom, and a radiation cylinder 4 located inside the inner cylinder 3 are concentrically disposed, and the annular space between the inner cylinder 3 and the intermediate cylinder 2 is filled with a reforming catalyst 5. A burner 7 supported on a burner mount base 6 is disposed in the upper portion of a combustion chamber 9 located inside the radiation cylinder 4. A cover plate (bottom plate) la which is a common one-piece plate is attached to the lower ends of the outer cylinder 1 and inner cylinder 3. In the single-pipe cylinder type reformer shown in FIG. 1, the burner 7 is disposed in the upper portion of the combustion chamber 9. However, the burner 7 is disposed in the lower portion of the combustion chamber 9 in some case (not shown). In such a case, the cover plate 1a is attached as a ceiling plate, which is a common one-piece disk, attached to the upper ends of the outer cylinder 1 and inner cylinder 3.

The single-pipe cylinder type reformer shown in FIG. 1 operates as follows.

The burner 7 generates a high-temperature combustion gas in the combustion chamber 9 with a combustion flame 8. The heat is transferred outside the inner cylinder in the radial direction via the radiation cylinder 4 to heat the reforming catalyst 5. At the same time, the high-temperature combustion gas enters the inner cylinder 3 from the lower portion of the radiation cylinder 4 to become an ascending current, thereby directly heating the reforming catalyst 5. The combustion gas is discharged from the upper end portion of the reformer after heating. Meanwhile, the reformation material gas which is fed from the upper portion of the reformer is heated to about 700° C. while descending the annular flow path filled with the reforming catalyst 5. As a consequence, steam reforming is sufficiently performed. The reformed material gas (reformed gas) is reversed in the lower end portion of the reformer to become an ascending current in the path formed between the outer cylinder 1 and the inner cylinder 3. Meanwhile, the sensible heat of the reformed gas is recovered in the reforming step inside the intermediate cylinder 2. As a result, the temperature of the reformed gas lowers, and the gas is extracted outside as a reformed gas from the upper end portion of the reformer.

The conventional single-pipe cylinder type reformer shown in FIG. 1 suffers the following problems.

(1) Since the common one-piece cover plate 1a is hermetically fixed to the lower end portions of the outer cylinder 1 and inner cylinder 3, which require a partition for a fluid, by welding or the like, the thermal stresses produced in the outer cylinder 1 and inner cylinder 3 due to the temperature difference during operation cause buckling of the inner cylinder 3 which is heated to a high temperature, in particular. The following factors due to this buckling may degrade the performance of the reformer:

a. leakage of the reformed gas due to a crack in the inner cylinder 3;

b. damage to the reforming catalyst due to the deformation of the inner cylinder 3; and c. uneven heating in the circumferential direction due to the deformation of the inner cylinder 3.

(2) Since the combustion chamber 9 is partitioned off from the outside with the one-piece cover plate 1a common to the inner cylinder 3 and outer cylinder 1, the heat insulating properties are poor, and the heat radiation loss from the cover plate 1a portion increases.

When a polymer electrolyte fuel cell is used for a home, vehicle, or the like, a reduction in the size and weight of the overall reforming apparatus including a single-pipe cylinder type reformer is an essential condition. In addition, various improvements, e.g., efficient operation and a reduction in rise time for the start of operation, are required.

For example, the required improvements include a reduction in fuel by efficient preheating of a reformation material gas, an improvement in operability by prevention of overheating of a steam generator, an increase in efficiency by the preservation of a necessary temperature inside the reformer and the effective use of heat quantity, suppression of heat radiation to the outside by an effective heat insulating structure, realization of high durability by a reduction in heat stress due to an inner temperature difference, an increase in efficiency of steam generation by the effective use of reaction heat, and an operation method capable of efficiently coping with variations in operation state.

The reformed gas produced by the conventional single-pipe cylinder type reformer contains about 10% of CO. When such a reformed gas is to be used for a polymer electrolyte fuel cell, the CO concentration must be decreased to about 0.5% by using a CO transformer, and a CO selective oxidation reaction must be caused by using a CO selective oxidizing unit to decrease the CO concentration to about 10 ppm. However, separately providing the CO transformer and CO selective oxidizing unit for the single-pipe cylinder type reformer is not preferable in terms of a reduction in size, an increase in efficiency, and starting characteristics.

SUMMARY OF THE INVENTION

The present invention has been made in consideration of the above problems in the prior art, and has as its first object to provide a single-pipe cylinder type reformer which prevents the generation of thermal stresses by liberating thermal displacement of outer and inner cylinders forming a reformer in the axial direction, prevents the occurrence of buckling of the inner cylinder and a deterioration in the performance of the reformer due to the buckling, in particular, and reduces a heat radiation loss from a combustion chamber through a cover plate.

It is the second object of the present invention to provide a single-pipe cylinder type reformer which produces a gas with a low CO concentration, operates efficiently, has good start-up characteristics, attains reductions in size and weight, and is thermally stable and efficient.

In order to achieve the first object of the present invention, according to the first aspect of the present invention, there is provided a single-pipe cylinder type reformer characterized by comprising an upright outer circular cylinder, a circular cylinder concentrically located inside the outer cylinder at a distance in a radial direction, a circular intermediate cylinder unit concentrically located between the outer cylinder and the inner cylinder at a distance in the radial direction, a circular radiation cylinder concentrically located inside the inner cylinder at a distance in the radial direction, a burner fixed to one end portion of the reformer in an axial direction to be located in the center of the radiation cylinder in the radial direction, and a plurality of annular flow paths formed in laminar shapes in the radial direction between the inner cylinder and the intermediate cylinder unit and between the intermediate cylinder unit and the outer cylinder, the annular flow paths being at least partly filled with a reforming catalyst serving as a reforming catalyst layer and communicating with each other, wherein end portions of the outer and inner cylinders in the axial direction which are located on a side opposite to a position where the burner is fixed are sealed with different cover plates such that the cover plates are located at a predetermined distance away from each other, thereby forming a double-bottom structure.

In the first aspect of the present invention, the burner is fixed to an upper end of the reformer, and the cover plates are respectively mounted on lower ends of the outer and inner cylinders.

The burner is fixed to a lower end of the reformer, and the cover plates are respectively mounted on upper ends of the outer and inner cylinders.

In the first aspect of the present invention, a steam generator is further disposed inside or outside the reformer.

The single-pipe cylinder type reformer according to the first aspect of the present invention is used for a fuel cell.

In order to achieve the first and second objects, in a single-pipe cylinder type reformer comprising an upright outer circular cylinder, a circular cylinder concentrically located inside the outer cylinder at a distance in a radial direction, a plurality of circular intermediate cylinders concentrically located between the outer cylinder and the inner cylinder at distances from each other in the radial direction, a circular radiation cylinder concentrically located inside the inner cylinder at a distance in the radial direction, a burner fixed to one end portion of the reformer in an axial direction to be located in the center of the radiation cylinder in the radial direction, and a plurality of annular flow paths formed in laminar shapes in the radial direction between the inner cylinder and the innermost intermediate cylinder, between the adjacent intermediate cylinders, and between the outermost intermediate cylinder and the outer cylinder, the annular flow paths being at least partly filled with a reforming catalyst serving as a reforming catalyst layer and communicating with each other, the present invention has the following characteristic aspects.

1. A steam generator is disposed inside a radiation cylinder, and the steam generator is heated through the wall surface of the radiation cylinder.

2. A preheat layer filled with a heat transfer promoting member is disposed before the upper portion of a reforming catalyst layer filled with a reforming catalyst.

3. The heat recovery layer is disposed around a reforming catalyst layer to be connected thereto at the lower end. A reformed gas is made to ascend through the heat recovery layer to transfer the heat of the reformed gas to the reforming catalyst layer.

4. The heat recovery layer is filled with ceramic balls each having a predetermined diameter.

5. The reformer includes a heat recovery layer which is disposed around a reforming catalyst layer for reforming the reformation material gas to be connected thereto at the lower end, and transfers the heat of a reformed gas to the reforming catalyst layer as the reformed gas ascends inside the heat recovery later, a CO converter catalyst layer (to be also referred to as a shift layer hereinafter) which is disposed around the heat recovery layer to be connected thereto at an upper portion, and reduces CO in the reformed gas as the reformed gas descends inside the CO converter catalyst layer, a second shift layer which is disposed around the shift layer to be connected thereto at a lower portion, connected to a CO selective oxidizing catalyst layer (to be also referred to as a PROX layer hereinafter) for reducing CO in the reformed gas by causing it to react with oxygen in air as the reformed gas ascends inside the CO selective oxidizing catalyst layer and/or the shift layer at a lower portion, and reduces CO in the reformed gas as the reformed gas ascends inside the second shift layer, and a cooling fluid path which is formed between the shift layer and the PROX layer and/or the second shift layer, forms a descending path from the inlet for the reformed gas on the PROX layer and/or second shift layer side, reverses the reformed gas at the lower end of the descending path, and serves as an ascending path on the shift layer side to allow a cooling fluid to pass.

6. An upper portion of a heat recovery layer, i.e., part of the downstream side, serves as a sub-CO converter catalyst layer (sub-shift layer).

7. Combustion air, a reformation material gas to be fed into the reforming catalyst layer, gaseous or liquefied reforming water, or a fluid as a combination thereof is fed into the cooling fluid path.

8. A predetermined gap is ensured between the outer wall surface of the heat recovery layer and the inner wall surface (inner cylinder) of the shift layer, and the bottom portion of the inner wall (inner cylinder) of the shift layer is separated from the bottom portion of the outer wall of the heat recovery layer, thereby forming a double-bottom structure.

9. An air path is formed in the outermost annular flow path formed between the circular outer cylinder and the outermost intermediate cylinder and the bottom portion of the annular flow path, an air inlet is formed in at least the side wall or bottom plate of the outermost intermediate cylinder, and air is evenly supplied into an annular path formed between the outermost intermediate cylinder located on the side and the second outermost intermediate cylinder adjacent to the outermost annular flow path.

10. The PROX layer is made up of a PROX layer and an air mixing layer which is formed before the PROX layer to mix the oxygen and reformed gas, and the air mixing layer is formed at the position of the air inlet.

11. Reforming water fed into the cooling fluid path cools the shift layer and PROX layer and/or second shift layer which are in contact with the cooling fluid path, and is heated and evaporated by reaction heat.

12. A heat insulator is charged in between the bottom portion or inner cylinder and the intermediate cylinder, between the respective intermediate cylinders, and the intermediate cylinder and the outer cylinder, as needed.

13. The shift layer and PROX layer and/or second shift layer are shorter than the heat recovery layer in the axial direction.

14. The shift layer and PROX layer and/or second shift layer are connected such that a reformed gas from the shift layer is temporarily discharged into an air path formed outside the PROX layer and/or second shift layer, merges with air in the air path, and is fed into the PROX layer and/or second shift layer again.

15. The reformer described above is used as a hydrogen source for a polymer electrolyte fuel cell.

16. Operation of the single-pipe cylinder type reformer described above includes a. the step of supplying saturated or superheated steam extracted from a saturated or superheated steam outlet of the steam generator, together with a reformation material gas, in start-up operation in which an internal temperature of the reformer is not more than a predetermined temperature, the step of closing the saturated or superheated steam outlet and opening a wet steam outlet of the steam generator to supply wet steam together with a reformation material gas when the internal temperature exceeds the predetermined temperature, and the step of performing steam reforming for a reformation material gas in the annular flow path, and b. regulating the opening degree of the regulating valve disposed at the wet steam outlet in accordance with a variation in operation state so as to maintain the inflection point temperature of the shift layer and the temperatures of the PROX layer and/or second shift layer at a predetermined temperature.

According to the present invention, the following excellent effects can be obtained.

(1) Since the thermal displacement of the outer and inner cylinders in the axial direction is liberated, deformation of each cylinder due to a thermal stress, especially buckling of the inner cylinder, and a deterioration in the performance of the reformer due to the buckling can be prevented.

(2) Since the combustion chamber is partitioned off from the outside of the reformer by multiple cover plates (bottom plates) including gas stagnation spaces, the heat insulating effect improves, and a heat radiation loss from the reformer is suppressed, thus improving the performance of the reformer.

(3) The formation of the preheat layer before the reforming catalyst layer can obviate the necessity of a material preheating unit and reduce the heat consumption.

(4) The inlet of the preheat layer is brought near the outlet of the heat recovery layer to lower the temperature at the outlet of the heat recovery layer. This makes it possible to directly connect the reforming catalyst layer to the CO converter catalyst layer.

(5) The formation of the steam generator which is heated by using part of the radiation cylinder as a heat transfer surface allows a boiler to be integrally incorporated in a compact reformer, thus preventing damage due to overheating and allowing efficient use of the heat quantity of a combustion exhaust gas. Therefore, the thermal efficiency can be improved.

(6) Since the heat recovery layer is filled with a heat transfer promoting filler, the heat recovery efficiency can be improved, and the temperature at the outlet can be lowered.

(7) Since the cooling fluid path is formed between the CO converter catalyst layer and the CO selective oxidizing catalyst layer and/or second shift layer, the CO selective oxidizing catalyst layer and/or second shift layer can also be integrally formed. In addition, reaction heat from the CO converter catalyst layer and CO selective oxidizing catalyst layer and/or second shift layer can be recovered, and hence the efficiency can be improved. Furthermore, undesirable side reactions can be suppressed. By changing the thermal load supplied to the cooling fluid path, the temperatures of the shift layer and CO selective oxidizing catalyst layer and/or second shift layer can be maintained within a predetermined range.

(8) The wall surface of the heat recovery layer and the wall surface of the CO converter catalyst layer are separately formed, and a gap is ensured between the wall surfaces. This improves the heat insulating properties between the two layers, improves the recovery efficiency in the heat recovery layer, and suppresses an increase in the temperature of the CO converter catalyst layer.

(9) Since air for the CO selective oxidizing catalyst layer and/or second shift layer is fed into the air path formed between the outer cylinder and the CO selective oxidizing catalyst layer and/or second shift layer, and air supply ports are formed in the CO selective oxidizing catalyst layer and/or second shift layer, air can be evenly supplied to the CO selective oxidizing catalyst layer and/or second shift layer, and a hydrogen loss can be reduced. In addition, a heat radiation loss can be reduced by heat insulation. The air mixing layer for mixing air in the CO selective oxidizing catalyst layer and/or second shift layer is formed by charging a filler. This makes it possible to mix a reformed gas with air without using any mixing unit and reduce the hydrogen loss.

(10) Since reforming water is evaporated in the cooling fluid path between the CO converter catalyst layer and the CO selective oxidizing catalyst layer and/or second shift layer, a boiler can be formed without using any fuel. A sufficient cooling ability with respect to the CO converter catalyst layer and CO selective oxidizing catalyst layer and/or second shift layer can be obtained. The arrangement of a nozzle or the like can be simplified.

(11) By regulating the regulating valve of the steam generator, the amount of wet steam is changed to quicken the temperature rise time in start-up operation. In steady operation, reaction heat and sensible heat of a reformed gas are recovered to improve the efficiency. Furthermore, the temperatures of the CO converter catalyst layer and CO selective oxidizing catalyst layer and/or second shift layer can be regulated.

(12) Since the concentration of carbon monoxide in a reformed gas can be reduced to a predetermined value or less, the reformer can be used as a hydrogen generator for a polymer electrolyte fuel cell. This makes it possible to obtain a compact, high-efficiency fuel cell.

(13) Since the flow path comprising the CO converter catalyst layer and CO selective oxidizing catalyst layer and/or second shift layer is shorter than the heat recovery layer, an excessive rise in the temperature of the CO converter catalyst layer can be prevented, and the temperature can be maintained at a proper temperature. Therefore, no reaction is inhibited.

(14) Since the reformer is filled with an insulating material at proper portions, heat radiation from the reformer can be prevented, and the thermal efficiency can be improved. In addition, each portion is properly insulated from heat, and hence the temperature of each portion can be maintained at a proper temperature.

(15) The formation of the CO converter catalyst layer on the downstream side of the heat recovery layer can quickly raise the temperature of the CO converter catalyst layer. Therefore, a reaction can be quickly caused in the CO converter catalyst layer at start-up. This makes it possible to quickly start the reformer.

(16) Since a reformed gas passing through the CO converter catalyst layer and air can be sufficiently agitated, reactions can be reliably and efficiently caused in the CO selective oxidizing catalyst layer and/or second shift layer, thus improving the hydrogen production efficiency of the reformer.

The above and other many objects, aspects, and merits of the present invention will be apparent to those skilled in the art from the following detailed description exemplifying the preferred embodiments conforming to the principle of the present invention and the accompanying drawings.

DETAILED DESCRIPTION OF THE PREFERRED EMBODIMENTS

A few preferred embodiments of the present invention will be described below with reference to the accompanying drawings.

Figure 1:
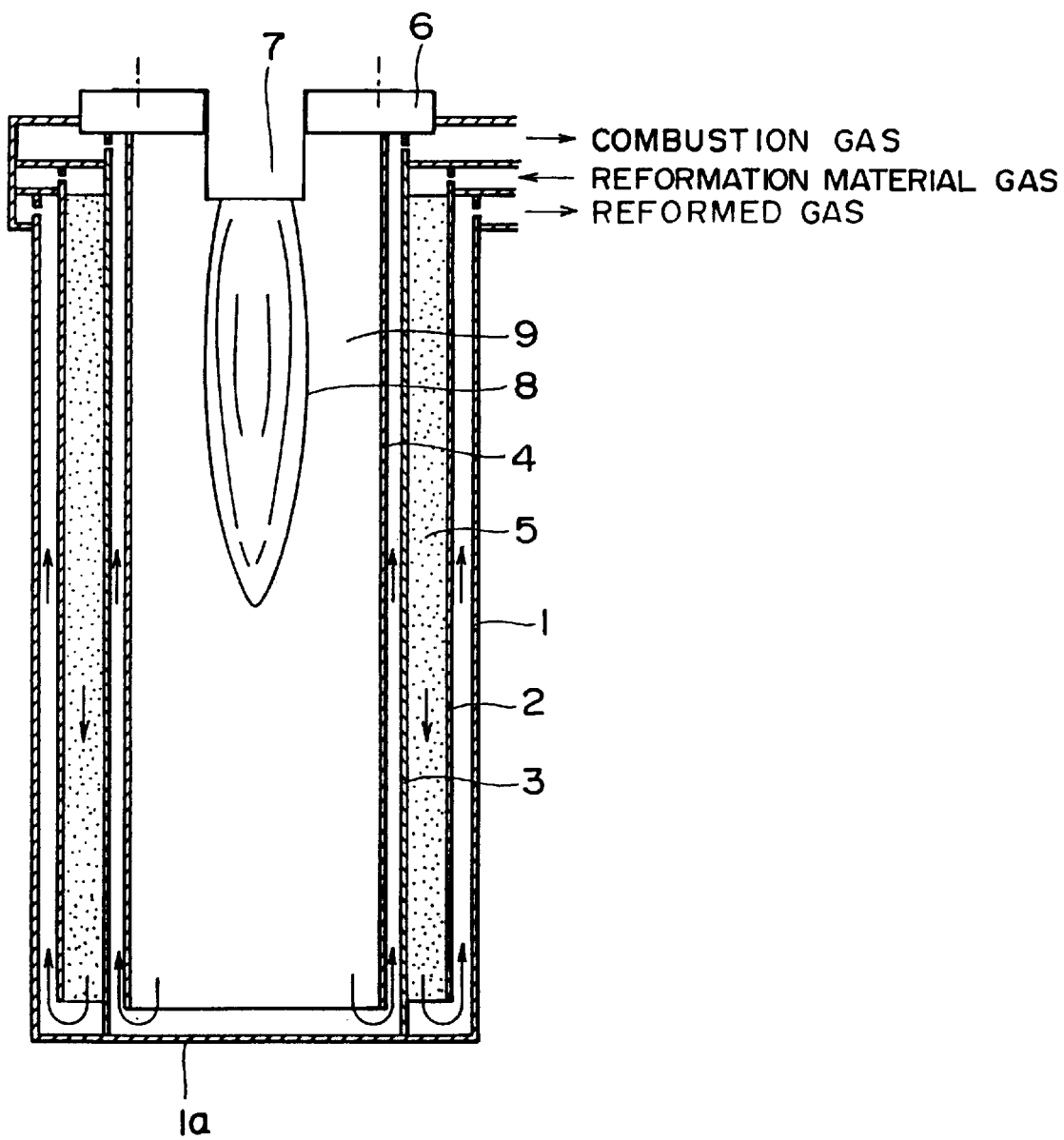
FIG. 1 is a longitudinal sectional view showing the schematic arrangement of a conventional single-pipe cylinder type reformer.
Figure 2:
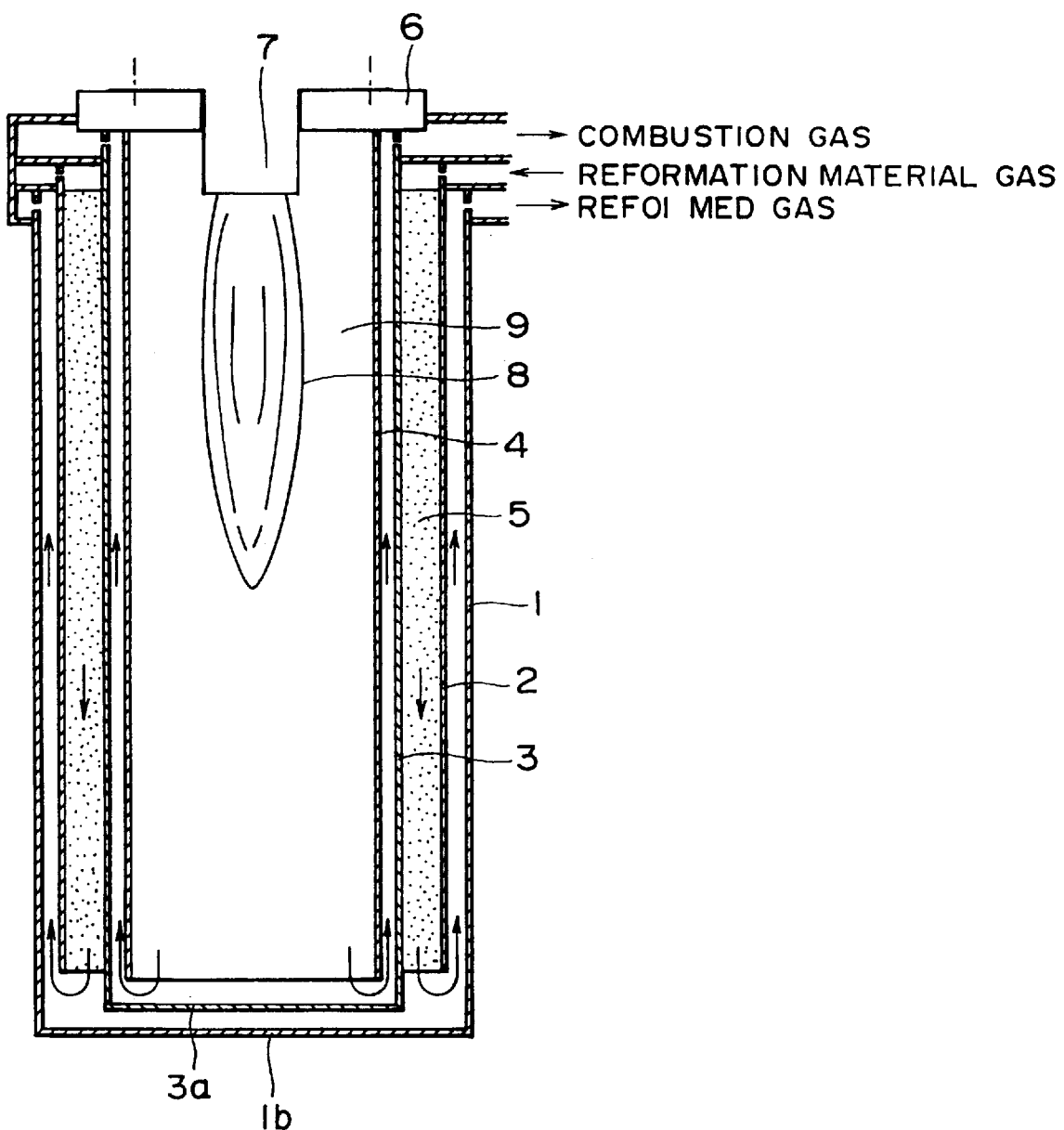
FIG. 2 is a longitudinal sectional view showing the schematic arrangement of a single-pipe cylinder type reformer according to the first embodiment of the present invention.

FIG. 2 is a longitudinal sectional view showing the schematic arrangement of a single-pipe cylinder type reformer according to the first embodiment of the present invention.

In the reformer according to the first embodiment shown in FIG. 2, an elongated outer cylinder 1 having a circular cross-section is disposed upright, and an elongated inner cylinder 3 having a circular cross-section is concentrically located inside the outer cylinder 1. An intermediate cylinder 2 surrounding the inner cylinder 3 is located inside the outer cylinder 1 at a predetermined distance from the inner cylinder 3. The annular space defined between the inner cylinder 3 and the intermediate cylinder 2 is filled with a reforming catalyst 5. A radiation cylinder 4 is also concentrically located inside the inner cylinder 3. A burner 7 is mounted in the upper portion of a combustion chamber 9 formed inside the radiation cylinder 4 via a burner mount base 6. Separate cover plates (bottom plates) 1b and 3a are hermetically fixed to the lower end portions of the outer cylinder 1 and inner cylinder 3 in the axial direction, respectively, which oppose the burner 7, by welding or the like. A predetermined space is defined between the cover plate 1b of the outer cylinder 1 and the cover plate 3a of the inner cylinder 3. In other words, the cover plates 1b and 3a form a double structure with respect to the center direction of the outer cylinder 1 and inner cylinder 3.

In the first embodiment, the burner 7 and burner mount base 6 are disposed on the upper portion of the combustion chamber 9, and the cover plates (bottom plates) 1b and 3a are respectively attached to the lower ends of the outer cylinder 1 and inner cylinder 3 to form a double structure. Although not shown, as in another embodiment, the burner 7 and burner mount base 6 may be disposed on the lower portion of the combustion chamber 9. In this case as well, the cover plates (ceiling plates in this case) of the inner cylinder 3 and outer cylinder 1 form a double structure (not a common one-piece disk). The distance between the cover plates 1b and 3a in the axial direction is properly determined in consideration of the thermal displacement difference between the outer cylinder 1 and the inner cylinder 3 in the axial direction and prevention of natural convection of a reformed gas.

Although not shown in FIG. 2, a steam generator for generating/supplying steam to be fed into the reformer together with a reformation material gas such as a town gas is provided inside or outside the reformer.

The reformer shown in FIG. 2 operates as follows.

When, for example, a fuel formed by a town gas (13A) and combustion air are supplied to the burner 7 and burnt, they burst into a combustion flame 8 in the combustion chamber 9. The combustion chamber 9 is then filled with a high-temperature combustion gas. The heat of this high-temperature combustion gas indirectly heats the reforming catalyst 5 via the radiation cylinder 4. At the same time, the gas enters the inner cylinder 3 from the lower portion of the radiation cylinder 4 to become an ascending current, and directly heats the reforming catalyst 5 via the wall of the inner cylinder 3. The gas is then discharged from the upper end portion of the reformer. The reformation material gas made up of the town gas fed from the upper portion of the reformer and the steam supplied from the steam generator (not shown) is heated to about 700° C. by the combustion gas while descending the annular flow path filled with the reforming catalyst. As a consequence, steam reforming is sufficiently done. The temperature of the reforming catalyst becomes highest at the lower end portion of the annular flow path filled with the reforming catalyst, i.e., near the lower end of the intermediate cylinder 2. The reformed gas flowing out from the lower end portion of the annular flow path reverses and becomes an ascending current. While the reformed gas ascends, its latent heat is recovered in the reforming step inside the intermediate cylinder 2. As a result, the temperature of the gas lowers, and the gas is extracted as a hydrogen-rich reformed gas (a gas mixture of hydrogen, CO, $CO_2$, and the like) from the upper end portion of the reformer.

In addition to the first embodiment, the present invention provides a single-pipe cylinder type reformer which produces a gas with a low CO concentration, operates efficiently, has good starting characteristics, realizes reductions in size and weight, and is thermally stable and efficient.

Figure 3:
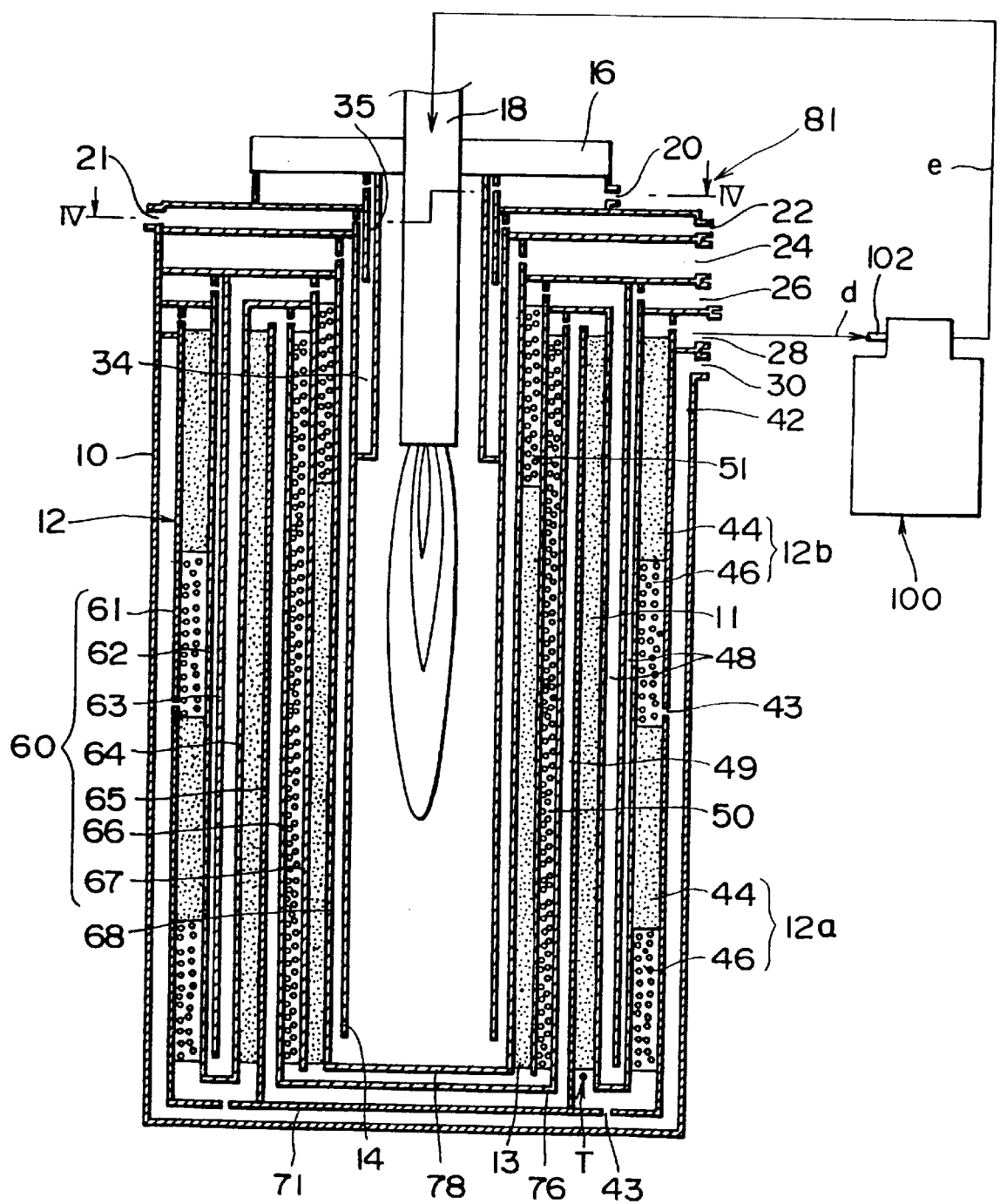
FIG. 3 is a longitudinal sectional view showing the schematic arrangement of a single-pipe cylinder type reformer according to the second embodiment.

As the second embodiment of the present invention, FIG. 3 shows an example of the schematic arrangement of a compact, lightweight, single-pipe cylinder type reformer.

A reformer 81 is comprised of an outer cylinder 10, an intermediate cylinder group 60 concentrically located in the outer cylinder 10, an inner cylinder 68 concentrically located inside these intermediate cylinders, a reforming catalyst layer 13 disposed in the annular space defined between the inner cylinder 68 and an innermost intermediate cylinder 67, a CO converter catalyst layer 11 (to be also referred to as a shift layer 11 hereinafter) disposed in the annular space defined between intermediate cylinders 65 and 64, a CO selective oxidizing catalyst layer 12 (to be also referred to as a PROX layer 12 hereinafter) disposed in the annular space defined between an outermost intermediate cylinder 61 and a second outermost intermediate cylinder 62, and the like.

A heat transfer partition wall 14 (radiation cylinder) is concentrically located inside the inner cylinder 68. A burner 18 is mounted inside the heat transfer partition wall 14 via a burner mount base 16.

The outer cylinder 10 is a closed-end cylinder having a circular cross-section. The side surface of the upper portion of the outer cylinder 10 has a saturated or superheated steam outlet 20, wet steam outlet 21, water supply port 22, combustion exhaust gas outlet 24, supply port 26 for a fluid mixture of a reformation material gas and steam, reformed gas outlet 28, and supply port 30 for PROX layer air.

The intermediate cylinder group 60 is constituted by the first to seventh intermediate cylinders 61 to 67, and annular spaces are defined between the respective intermediate cylinders. An air path 42 for supplying air to the PROX layer 12 is formed between the first intermediate cylinder 61 and the outer cylinder 10. This air path 42 communicates throughout the circumference at the bottom to form a jacket structure surrounding the overall apparatus with an air layer. The first intermediate cylinder 61 also has air inlets 43 for feeding air, which are formed in a bottom 71 and the side surface.

The upper and lower PROX layers 12 are formed between the first and second intermediate cylinders 61 and 62. Each PROX layer 12 is made up of a PROX catalyst layer 44 and air mixing layer 46. A lower PROX layer 12a communicates with the shift layer 11, located inward therefrom, at the lower portion. A lower PROX layer 12b is connected to the reformed gas outlet 28 at the upper portion. The reformed gas outlet 28 is connected to, for example, a fuel gas supply pipe 102 of a polymer electrolyte fuel cell 100. A reformed gas d (fuel gas) which contains hydrogen having a predetermined concentration and is extracted from the reformed gas outlet 28 is supplied to the fuel electrode side (not shown) of the polymer electrolyte fuel cell 100. With this operation, electric power generation is performed. A surplus reformed gas e in the polymer electrolyte fuel cell 100 may be used as a combustion gas for the burner 18.

The air mixing layer 46 is filled with ceramic balls each having a predetermined diameter. When air passes through the air mixing layer 46, the ceramic balls bend the flow path to efficiently mix the gases. In addition, the air inlets 43 are formed in the lower portion of the air mixing layer 46, i.e., near the end portion on the upstream side of the air mixing layer 46. The diameter of each ceramic ball is set to $1/3$ to $1/10$ the width of the flow path in the air mixing layer 46 in consideration of an increase in flow resistance and mixing efficiency. If the diameter of each ceramic ball is $1/3$ or more the width of the flow path, mixing cannot be sufficiently done. If this diameter is $1/10$ or less, the flow resistance undesirably increases.

A cooling fluid path 48 through which a cooling fluid passes, with the third intermediate cylinder 63 being located inside the path, is formed between the second intermediate cylinder 62 and the fourth intermediate cylinder 64. This flow path is connected to the supply port 26 for a fluid mixture of a reformation material gas and steam at the upper portion. Since the third intermediate cylinder 63 is attached to an upper portion with a space being ensured at a lower portion, the cooling fluid path 48 is divided in the radial direction at the third intermediate cylinder 63 as a boundary. The outer path portion serves as a descending path contacting the PROX layer 12, and the inner path serves as an ascending path contacting the shift layer 11. Note that the main cooling fluid flowing through the cooling fluid path 48 is a fluid mixture of a reformation material gas and reforming water. As will be described later, another fluid may pass through this flow path.

The shift layer (CO converter catalyst layer) 11 is formed between the fourth and fifth intermediate cylinders 64 and 65. The shift layer 11 is filled with a CO converter catalyst. The shift layer 11 is connected to a heat recovery layer 50 at an upper portion and connected to the PROX layer 12 at a lower portion and perform a CO transforming reaction. The fifth intermediate cylinder 65 is connected to the bottom portion of the first intermediate cylinder 61 at a lower portion. The fifth intermediate cylinder 65 serves as the inner wall of the shift layer 11, and the sixth intermediate cylinder 66 serves as the outer wall of the heat recovery layer 50. A space is defined between these walls and serves as a heat insulating layer 49 for insulating heat between these walls and also serves as a buffer mechanism for buffering a thermal stress between the walls.

The heat recovery layer 50 filled with ceramic balls is formed between the sixth and seventh intermediate cylinders 66 and 67. The diameter of each ceramic ball is $1/2$ to $1/5$ the width of the path in the heat recovery layer 50. If the diameter of each ceramic ball exceeds $1/2$ the width of the path, the heat transfer efficiency decreases. If this diameter is $1/5$ or less the width of the path, the flow resistance undesirably increases. The ceramic balls have the function of transferring the heat of a gas passing through the heat recovery layer 50 to the reforming catalyst layer 13 contacting the heat recovery layer 50 via the seventh intermediate cylinder 67. A bottom plate 76 is attached to the lower portion of the sixth intermediate cylinder 66. A space is defined between the bottom plate 76 and a bottom plate 78 attached to the lower portion of the inner cylinder 68.

A preheat layer 51 is disposed in the annular space defined between the seventh intermediate cylinder 67 and the inner cylinder 68 on the upstream side. This preheat layer 51 is also filled with a filler for improving the heat transfer effect, e.g., ceramic balls each having a diameter of $1/2$ to $1/5$ the width of the path. The reforming catalyst layer 13 is formed on the downstream side of the preheat layer 51. The preheat layer 51 communicates with the cooling fluid path 48 on the upstream side. The reforming catalyst layer 13 is filled with a reforming catalyst for performing steam reforming for a reformation material gas. The reforming catalyst layer 13 communicates, at its lower portion, with the lower end of the heat recovery layer 50 via the space defined between the bottom plate 78 of the inner cylinder 68 and the bottom plate 76 of the sixth intermediate cylinder 66. The space between the bottom plate 78 and the bottom plate 76 also serves as a heat insulating layer for a portion burnt by the burner 18.

The cylindrical heat transfer partition wall 14 is located inside the inner cylinder 68 at a proper distance from the bottom plate 78. The space between the heat transfer partition wall 14 and the inner cylinder 68 serves as an exhaust gas path through which the exhaust gas burnt by the burner 18 flows, and is connected to the combustion exhaust gas outlet 24 at an upper portion. A steam generator 34 is located inside the upper portion of the heat transfer partition wall 14.

The steam generator 34 is a gap having the heat transfer partition wall 14 as one surface. A partition wall 35 is disposed in the gap to partition it into inner and outer portions, which respectively communicate with the steam outlet 20 and water supply port 22. In addition, the wet steam outlet 21 is attached to the side of the steam generator 34 which opposes the outlet of the water supply port 22. The steam outlet 20 and wet steam outlet 21 are connected to the supply port 26 for a fluid mixture of a reformation material gas and steam via regulating valves B (see FIG. 4) for regulating flow rates.

The burner 18 is located in the center of the heat transfer partition wall 14. The burner 18 is disposed at a position where the nozzle is located below the lower end of the steam generator 34. Therefore, when the burner 18 is turned on and a flame comes from the nozzle, the flame does not directly touch the steam generator 34.

Figure 4:
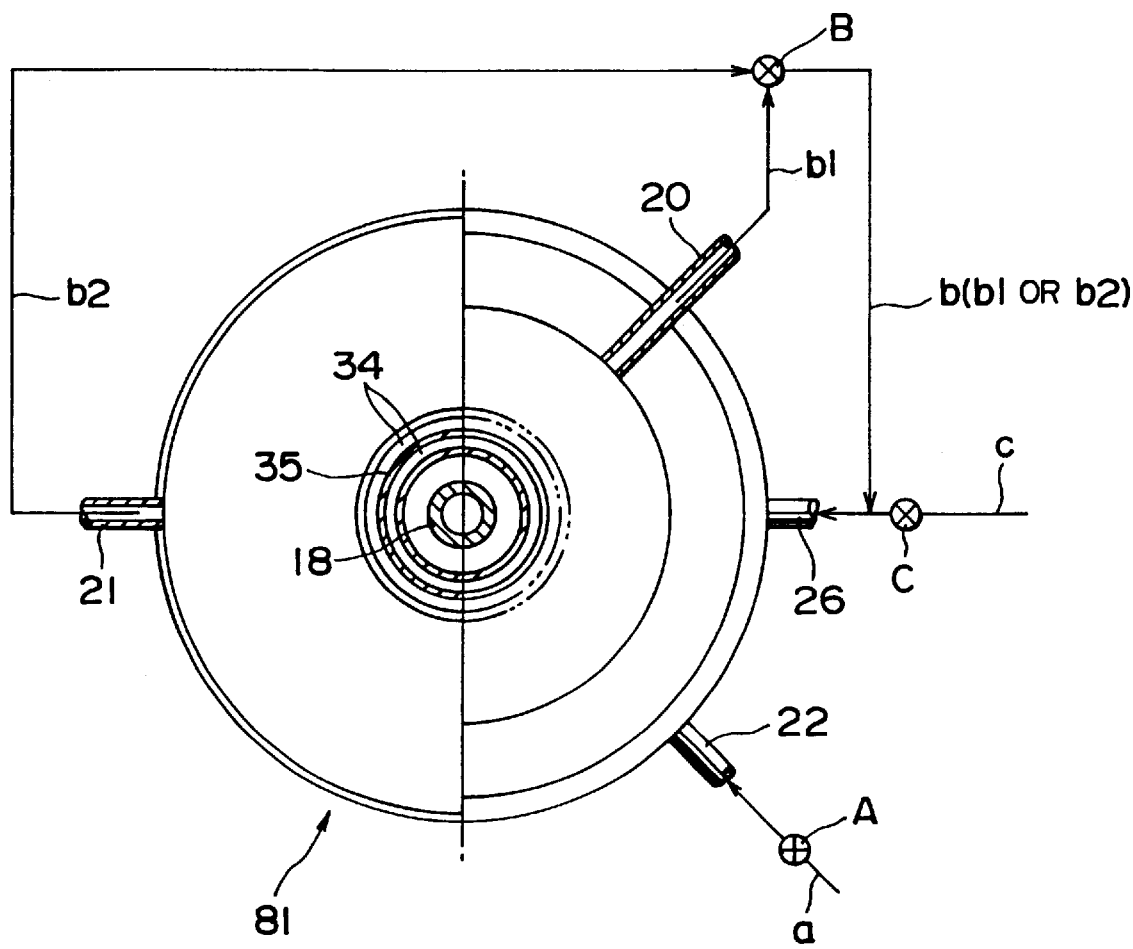
FIG. 4 is a horizontal sectional view taken along a line IV—IV in FIG. 3.

FIG. 4 is a horizontal sectional view taken along a line IV—IV in FIG. 3. Note that an illustration of the supply ports and outlets which are unnecessary for the following description is omitted.

Supply control for a fluid mixture of steam and a reformation material gas in the single-pipe cylinder type reformer according to the present invention will be described with reference to FIG. 4. Reforming water a is supplied to the steam generator 34 of the reformer 81 via a water supply valve A and the water supply port 22. At start-up, it takes a predetermined time to extract saturated or superheated steam b1 from the steam generator 34 via the superheated steam outlet 20 by turning on the burner 18 and performing heating operation using the burner 18. As the heating process by the burner 18 progresses and the temperature in the reformer rises, a predetermined amount of saturated or superheated steam b1 is extracted from the superheated steam outlet 20.

Meanwhile, a reformation material gas C to be reformed is supplied via a reformation material gas supply regulating valve C. By operating the regulating valve B, the reformation material gas c is fed into the reformer via the fluid supply port 26, together with the superheated steam b1 with which the reformation material gas c merges. Steam reforming for the reformation material gas c is then started in the reformer.

As the temperature in the reformer starts exceeding a predetermined temperature, the supply of the saturated or superheated steam b1 is stopped to shift the operation of the reformer from the start-up operation state to the steady operation state. In addition, in place of the superheated steam, the regulating valve B is operate d to supply wet steam b2 containing liquefied water which is discharged from the wet steam outlet 21 communicating with the steam generator 34.

Figure 5:
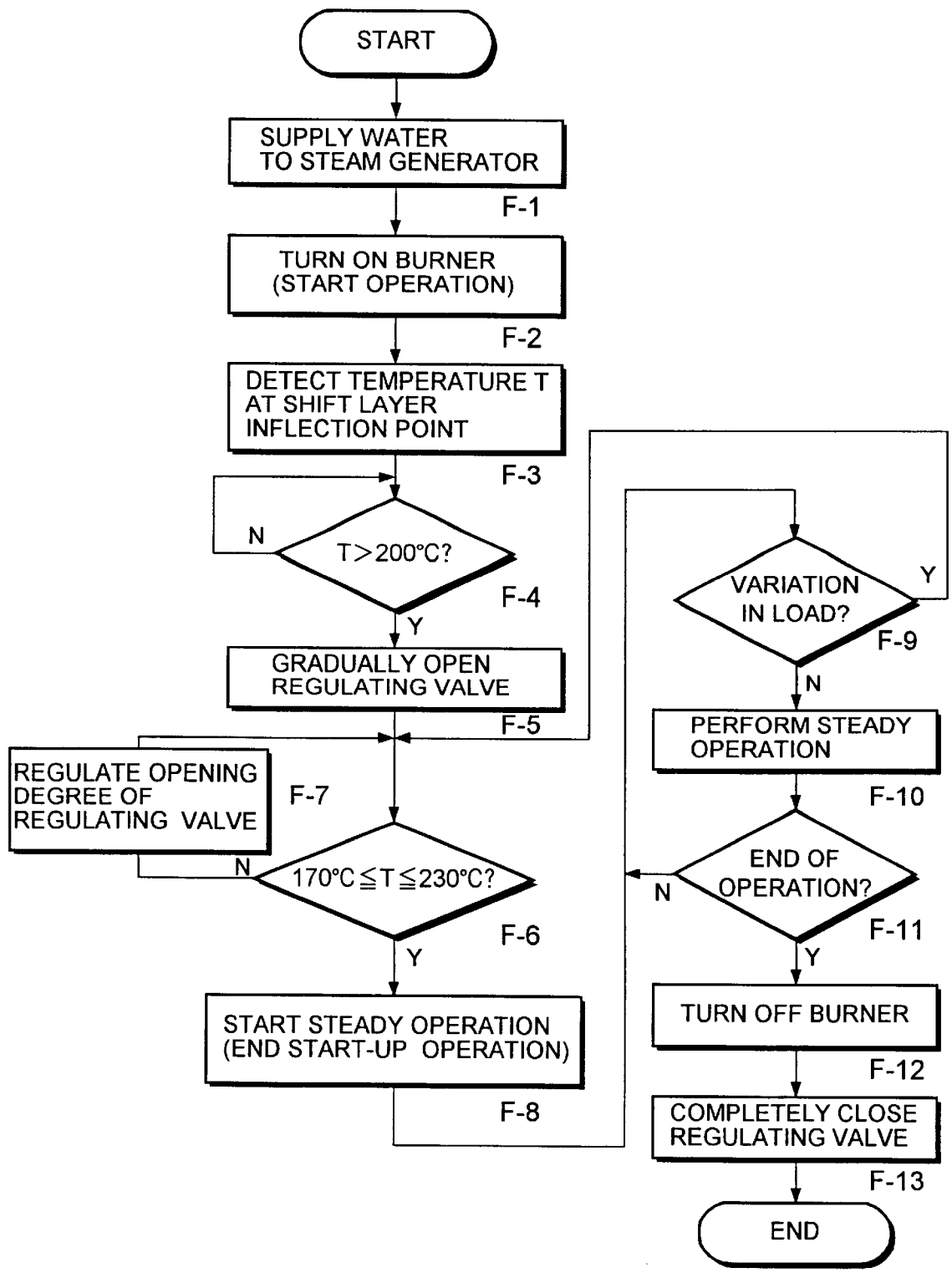
FIG. 5 is a flow chart for explaining the main operation of the single-pipe cylinder type reformer according to the present invention.

The main operation of the single-pipe cylinder type reformer according to the present invention will be described next with reference to FIG. 5.

First of all, the water supply valve A is opened to supply the water a from the water supply port 22 to the steam generator 34 in the reformer (F-1). The burner 18 mounted in the reformer is turned on to start the reformer (F-2). At the same time, the reformation material gas c to be reformed, with which the superheated steam b1 is mixed, is fed into the reformer. The temperature in the reformer is gradually raised by combustion performed by the burner 18. A temperature T at an inflection point P of the shift layer 11 is detected as a reference value for a shift to the steady operation (F-3). It is checked whether the inflection point temperature T is 200° C. or more (F-4). When the inflection point temperature T becomes 200° C. or more, the regulating valve B is gradually opened (F-5) to supply the wet steam b2 containing liquefied water, while mixing it with the reformation material gas c, in place of the superheated steam b1.

When the wet steam b2 is fed, the temperature in the reformer lowers. It is checked whether the return temperature T falls within the range from 170° C. and 230° C. both inclusive (170° C.≦T≦230° C.) (F-6). When the inflection point temperature T becomes 170° C. or less, the opening degree of the regulating valve B is regulated to suppress an increase in the amount of wet steam b2 supplied. When the inflection point temperature T becomes 230° C. or more, the opening degree of the regulating valve B is regulated to increase the amount of wet steam supplied (F-7).

When the inflection point temperature T falls within a predetermined temperature range (170° C.≦T≦230° C.) with stability, the start-up operation ends, and the steady operation starts (F-8).

If some load variation, e.g., a change in the operation state of the fuel cell 100, occurs after the start of the steady operation (F-9), the opening degree regulating state of the regulating valve B is set (F-6 and F-7). If no load variation occurs, the steady operation continues (F-10).

When the operation of the reformer ends (F-11), the burner 18 is turned off (F-12). Thereafter, the regulating valve B and all other valves are closed (F-13).

Of the operations described above, the main operation will be described in detail below in detail with reference to the reformer 81 shown in FIG. 3.

(I) Start-up

First of all, the reforming water a is supplied from the water supply port 22 into the steam generator 34. The burner 18 is then turned on to heat the inside of the reformer 81. As heating is performed by the burner 18, the heat transfer partition wall 14 is heated by radiation heat from the flame. In addition, the combustion exhaust gas passes between the heat transfer partition wall 14 and the inner cylinder 68 and is discharged from the combustion exhaust gas outlet 24, thereby internally heating the reforming catalyst 13 and preheat layer 51.

The steam generator 34 is gradually heated by the combustion exhaust gas passing between the heat transfer partition wall 14 and the inner cylinder 68, a rise in temperature in the combustion chamber of the burner 18, and transfer of heat from the heat transfer partition wall 14.

When the steam generator 34 is sufficiently heated, and the amount of saturated or superheated steam b1 generated reaches a predetermined value, the steam b1 is extracted from the steam outlet 20. The steam b1 is then supplied through the reformation material gas supply port 26 after the reformation material gas c is added to the steam.

Since the steam generator 34 is heated by the combustion performed by the burner 18 in this manner, the steam b1 required to start the reformer 81 can be obtained in a relatively short period of time. In addition, by making the combustion exhaust gas from the burner 18 pass between the heat transfer partition wall 14 and the inner cylinder 68, the heat in the combustion exhaust gas is absorbed and effectively used, thus improving the efficiency.

The reformation material gas c is a hydrocarbon-based fuel such as town gas. When this gas is supplied from the supply port 26 together with the steam b1, it passes through the cooling fluid path 48 formed between the second and fourth intermediate cylinders 62 and 64 and is set to the preheat layer 51. During this period, in the cooling fluid path 48, since the temperatures of the shift layer and PROX layer 12 contacting the cooling fluid path 48 are low, the steam b1 and reformation material gas c supply heat to the shift layer 11 and PROX layer 12. The steam b1, in particular, liquefies to supply latent heat, thus quickening rises in the temperatures of the shift layer 11 and PROX layer 12.

When the reformation material gas c enters the preheat layer 51, since the ceramic balls charged in the preheat layer 51 are heated by heat from the burner 18, the reformation material gas c absorbs the heat to be heated to a predetermined temperature, required for a reforming reaction, or higher. This gas then enters the reforming catalyst layer 13. Since the reformation material gas c and steam b1 which have low temperatures are supplied to the preheat layer 51, the temperature of the preheat layer 51 near the inlet can be suppressed low. If the reformation material gas c is methane gas, the reformation material gas c entering the reforming catalyst layer 13 is reformed by the following reaction:

$$CH_4 + H_2O \rightarrow CO + 3H_2$$

Since the reforming reaction in the reforming catalyst layer 13 is an endothermic reaction, the reaction proceeds while the combustion heat from the burner 18 is absorbed. More specifically, when the combustion exhaust gas from the burner 18 passes between the heat transfer partition wall 14 and the reforming catalyst layer 13, the heat of the combustion exhaust gas is absorbed by the reforming catalyst layer 13. In the reforming catalyst layer 13, a reforming reaction proceeds accompanying a rise in temperature. When the reaction reaches almost equilibrium, the reformed gas flows out of the lower portion of the reforming catalyst layer 13, reverses at the lower end, and enters the heat recovery layer 50.

The heat recovery layer 50 is filled with ceramic balls, and the heat of the reformed gas is supplied to the reforming catalyst layer 13 via the ceramic balls. The upper end of the heat recovery layer 50 is in contact with the preheat layer 51 into which the reformation material gas c and steam b1 which have relatively low temperatures flow. For this reason, the temperature of the gas further lowers, and the gas flows out of the upper portion, with its temperature being set to a temperature suitable for a CO transforming reaction, reverses, and enters the shift layer 11.

The following CO transforming reaction takes place in the shift layer 11:

$$CO + H_2O \rightarrow CO_2 + H_2$$

Although the CO transforming reaction in the shift layer 11 is an exothermic reaction, since the shift layer 11 and heat recovery layer 50 are formed through a gap, the heat in the heat recovery layer 50 is not directly transferred to the shift layer 11 to heat it. This also makes it possible to suppress the temperature of the shift layer 11 low.

The reformed gas flowing out of the lower portion of the shift layer 11 reverses at the lower end and enters the PROX layer 12. The PROX layer 12 is comprised of the PROX catalyst layer 44 and air mixing layer 46. The reformed gas is mixed with the air fed from the air inlet 43 while passing through the air mixing layer 46, and a CO selective oxidizing reaction is performed by the PROX catalyst layer 44.

The following reaction takes place in the PROX layer 12:

$$2CO + O_2 \rightarrow 2CO_2$$

The air for CO selective oxidizing reaction transforms CO into $CO_2$ but oxidizes $H_2$ as well to consume $H_2$. To minimize oxidization of $H_2$, the air mixing layer 46 is disposed on the front stage to supply a minimum necessary amount of oxygen to the reformed gas to selectively cause an oxidizing reaction for CO. In addition, such a reaction is caused in a plurality of stages.

Furthermore, since the cooling fluid path 48 is formed between the shift layer 11 and the PROX layer 12, the time taken to obtain a temperature necessary for a reaction is shortened by heat from the steam b1 at start-up.

(II) Steady Operation

When the temperature at each reaction portion reaches a predetermined temperature, and a steady state is attained, the regulating valve communicating with the wet steam outlet 21 is gradually opened to supply the wet steam b2 containing liquefied water from the reformation material gas supply port 26, together with the reformation material gas c. The liquefied water contained in the wet steam b2 then absorbs the reaction heat in the shift layer 11 and PROX layer 12 to evaporate. Rises in the temperatures of the shift layer 11 and PROX layer 12 due to an exothermic reaction are suppressed by an endothermic effect produced by this vaporization of moisture. As a consequence, the temperature in the reformer can be maintained at a predetermined temperature.

In addition, since the reforming water is heated by the heat of the shift layer 11 and PROX layer 12 to vaporize, the fuel that is heated by the steam generator 34 to generate steam can be saved. The reformation material gas c is fed into the reforming catalyst layer 13 via the preheat layer 51, together with the heated steam.

As described above, the inside of the preheat layer 51 has already been heated by the burner 18, and the reformation material gas c and steam are heated by the preheat layer 51. For this reason, there is no need to separately prepare a preheat unit for raising the temperature of the reformation material gas c to the temperature required for the reforming catalyst layer 13, and the thermal efficiency can be improved. Furthermore, since the reformation material gas c is not supplied after it is heated to a high temperature, the temperature near the inlet of the preheat layer 51, e.g., the temperature at the outlet of the heat recovery layer 50, can be lowered. This makes it possible to continuously connect the shift layer 11, in which a reaction takes place at a temperature lower than the reaction temperature in the reforming catalyst layer 13, to the reforming catalyst layer 13 via the heat recovery layer 50.

The reformation material gas c heated by the preheat layer 51 is further heated by the reforming catalyst layer 13 to cause a reforming reaction. The resultant gas then flows out of the lower portion of the reforming catalyst layer 13. The reformed gas with a relatively high temperature which has flowed out of the lower portion of the reforming catalyst layer 13 ascends inside the heat recovery layer 50 and exchanges heat with the reforming catalyst layer 13 owing to the heat transfer promoting effect of the ceramic balls in the heat recovery layer 50. As a consequence, the temperature of the gas lowers. That is, the heat recovery layer 50 has a temperature gradient exhibiting a decrease in temperature toward the upper portion of the heat recovery layer 50, and the heat of the reformed gas is absorbed and its temperature lowers as the gas ascends inside the heat recovery layer 50. The same phenomenon occurs between the heat recovery layer 50 and the preheat layer 51. The heat which the heat recovery layer 50 absorbs from the reformed gas is transferred from the heat recovery layer 50 to the preheat layer 51 by using the temperature difference.

As describe above, the preheat layer 51 is formed before the reforming catalyst layer 13, and the inlet of the preheat layer 51 is located close to the outlet of the heat recovery layer 50. With this arrangement, as the reformation material gas c that is not preheated is fed into the preheat layer 51, a rise in the temperature at the inlet of the preheat layer 51, i.e., a rise in the temperature at the outlet of the heat recovery layer 50, is suppressed. This for the first time allows the shift layer 11 to be continuously formed.

The reformed gas whose temperature has dropped to a temperature suitable for a CO transforming reaction in the heat recovery layer 50 enters the shift layer 11 from its upper portion. As a consequence, CO contained in the reformed gas is transformed into carbon dioxide. Although this reaction is an exothermic reaction, the temperature of the gas lowers to a temperature suitable for a CO selection oxidizing reaction upon heat exchange with the cooling fluid path 48, and the gas enters the next PROX layer 12. In this stage, the reformed gas contains about 0.5% of CO.

As described above, since the heat insulating layer 49 is formed between the heat recovery layer 50 and the shift layer 11, the heat of the heat recovery layer 50 is insulated by the heat insulating layer 49, and the temperature of the shift layer 11 can be maintained at a predetermined temperature. In addition, any thermal stress due to the temperature difference between these layers can be eliminated to prevent damage.

Furthermore, the wet steam b2 is evaporated by the cooling fluid path 48 formed around the shift layer 11. This amounts to integrally incorporating a boiler portion in the layer. With this arrangement, the combustion heat generated by the burner 18 can be reduced, and the shift layer 11 and PROX layer 12 can be cooled by heat of evaporation to control the temperatures of the shift layer 11 and PROX layer 12 to a predetermined temperature. In the shift layer 11, therefore, the CO conversion ratio can be increased. In the PROX layer 12, a methanation reaction and reverse shift reaction, which are undesirable side reactions, can be suppressed. In addition, since the reaction heat and sensible heat in the shift layer 11 and PROX layer 12 can be recovered in this manner, the thermal efficiency can be improved.

In cooling the shift layer 11 and PROX layer 12, as a cooling fluid to be flowed into the cooling fluid path 48, combustion air, gaseous or liquefied reforming water, a reformation material gas, or the like or a combination thereof may be used. When, for example, combustion air is to be flowed into the cooling fluid path 48, the cooling fluid path 48 is exclusively used for combustion air or the cooling fluid path 48 may be separated into paths to allow combustion air to flow therethrough. Reforming water, reformation material gas, or the like is fed into the reformer 81 by forming a path independently of these paths. In general, as compared with a gas, with liquefied reforming water, a sufficient cooling ability can be obtained, and the temperature can be arbitrarily lowered. Combining this water with the reformation material gas c allows an inlet nozzle for a cooling fluid to be also used as an inlet nozzle for the reformation material gas c. In addition, since no outlet nozzle for a cooling fluid needs to be used, the arrangement can be simplified. By adjusting the amount of steam fed into the cooling fluid path 48, the amount of heat deprivation in the cooling fluid path 48 can be increased/decreased. This makes it possible to maintain the temperatures of the shift layer 11 and PROX layer 12, which are important for reactions, to a predetermined temperature.

The reformed gas flowing out of the shift layer 11 enters the air mixing layer 46 in which it is mixed with air from the air supply port 30. Since the reformed gas is mixed with the air while passing through the air mixing layer 46, the gas is sufficiently agitated without using any agitating unit or the like. Since the reformed gas enters the PROX catalyst layer 44 in an agitated state, an unnecessary hydrogen loss due to local generation of high-concentration of oxygen by a reaction in the PROX catalyst layer 44 can be prevented. In addition, since a hole 43 can be arbitrarily set, air can be introduced from an arbitrary position in the PROX layer 12. This makes it possible to reduce the amount of air required for selective oxidization removal of CO and suppress a hydrogen loss due to excess air.

When the reaction in the first PROX layer 12 is complete, the gas enters the next PROX layer 12 to reduce the CO concentration again. The reformed gas is extracted as a gas containing, for example, 75% of hydrogen, 5% of methane, 19% of carbon dioxide, 1% of nitrogen, and 10 ppm or less of carbon monoxide, from the reformed gas outlet 28. As described above, since the carbon monoxide concentration of the reformed gas is 10 ppm or less, the gas can be supplied to a polymer electrolyte fuel cell and used as a fuel gas for the polymer electrolyte fuel cell.

Since a space through which air fed into the PROX layer 12 flows is formed between the PROX layer 12 and the outer cylinder 10, and the amount of air flowing inside the PROX layer 12 is small, the air stagnates there, and a high heat insulating effect can be obtained. This makes it possible to maintain the temperature in the PROX layer 12 and prevent a heat radiation loss.

(III) Variation in Load in Operation State

A case wherein the use state of a fuel cell or the like is changed, and the operation state of the reformer 81 is changed will be described next.

When the operation state of the reformer 2 is changed for some reason, the amount of hydrogen generated is changed by adjusting the amount of reformation material gas supplied from the supply port 26. In such a case as well, the temperature at each portion must be kept almost constant in order to maintain a reaction. If, for example, the amount of reformed gas required decreases, and the amount of reformation material gas fed is decreased, the amount of reforming water must also be decreased. For this reason, the temperature of the shift layer 11 or PROX layer 12 may rise because of a reduction in the amount of cooling water.

When, for example, the amounts of reformation material gas c and reforming water are decreased, the regulating valve communicating with the wet steam outlet 21 in the steam generator 34 is opened to decrease the amount of saturated or superheated steam fed from the superheated steam outlet 20. With this operation, the moisture of steam flowing from the supply port 26 increases, and hence the quantity of heat absorbed by latent heat increases. This prevents rises in the temperatures of the shift layer 11 and PROX layer 12 and unnecessary heat loss. In addition, the temperature at each portion can be maintained without replenishing heat from another portion.

Since the steam generator 34 is heated by the transfer of heat through the heat transfer partition wall 14 and is not directly heated by the burner 18, even if the amount of reforming water to the steam generator 34 is decreased and the inside of the steam generator 34 is dried, the steam generator 34 is not overheated.

In contrast to this, if the amount of reformation material gas c is increased, the regulating valves B communicating with the wet steam outlet 21 is closed to increase the amount of saturated or superheated steam b1 from the saturated or superheated steam outlet 20. With this operation, the temperatures of the shift layer 11 and PROX layer 12 can be maintained at a predetermined temperature without causing any unnecessary thermal loss. In addition, since temperature control is performed by using reforming water, good controllability can be obtained as compared with a case wherein combustion air or the like is used.

Figure 6:
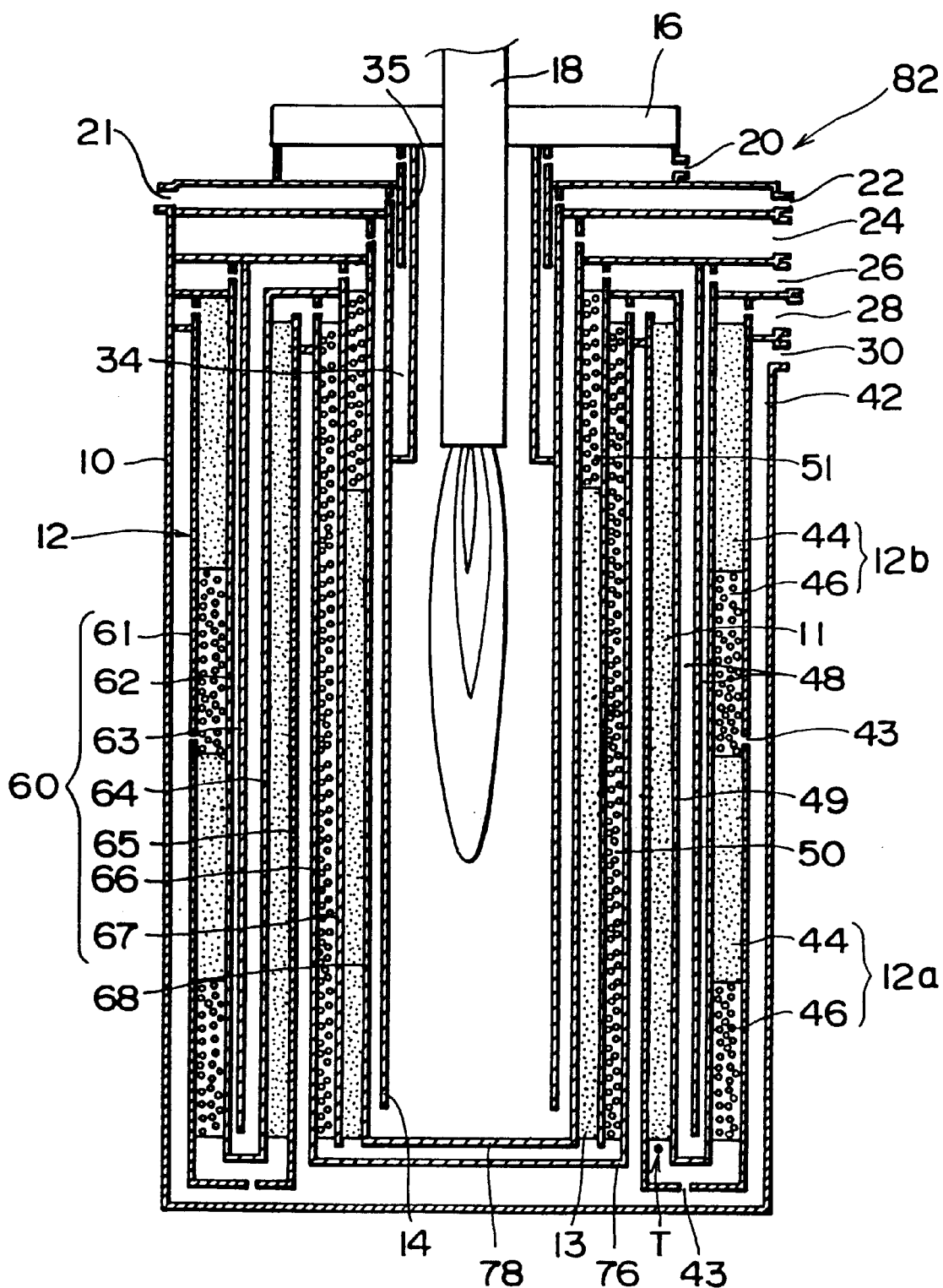
FIG. 6 is a longitudinal sectional view showing the schematic arrangement of a single-pipe cylinder type reformer according to the third embodiment of the present invention.

FIG. 6 shows another example of the compact, lightweight, single-pipe cylinder type reformer of the present invention as the third embodiment of the present invention.

As shown in FIG. 6, in a reformer 82, the inner bottom of an inner cylinder 65 is open, and the space between the inner cylinder 65 and an inner cylinder 66 is closed at an upper portion. The other arrangements are the same as those of the reformer 81 shown in FIG. 3. With this arrangement, an air path 42 for supplying oxygen to a PROX layer 12 communicates with the space between a heat recovery layer 50 and a shift layer 11 to improve the heat insulating effect for the shift layer 11. In addition, since the bottom portion of the heat recovery layer 50 is not located close to the bottom portion of the shift layer 11, heat radiation from the bottom portion of the reformer 82 can be suppressed.

In the above example, the PROX layer 12 is separated into the PROX layers 12a and 12b to form two layers on the outermost layer of the reformer 82. However, the PROX layer 12 may be a single layer or constituted by three or more layers. Furthermore, the shift layer 11 may also be formed on the outermost layer to form two layers, i.e., the shift layer 11 and PROX layer 12, on the outermost layer. Alternatively, a CO remover as the PROX layer 12 may be provided independently of the reformer 82, and the outermost layer of the reformer 82 may be formed by only the shift layer 11.

Figure 7:
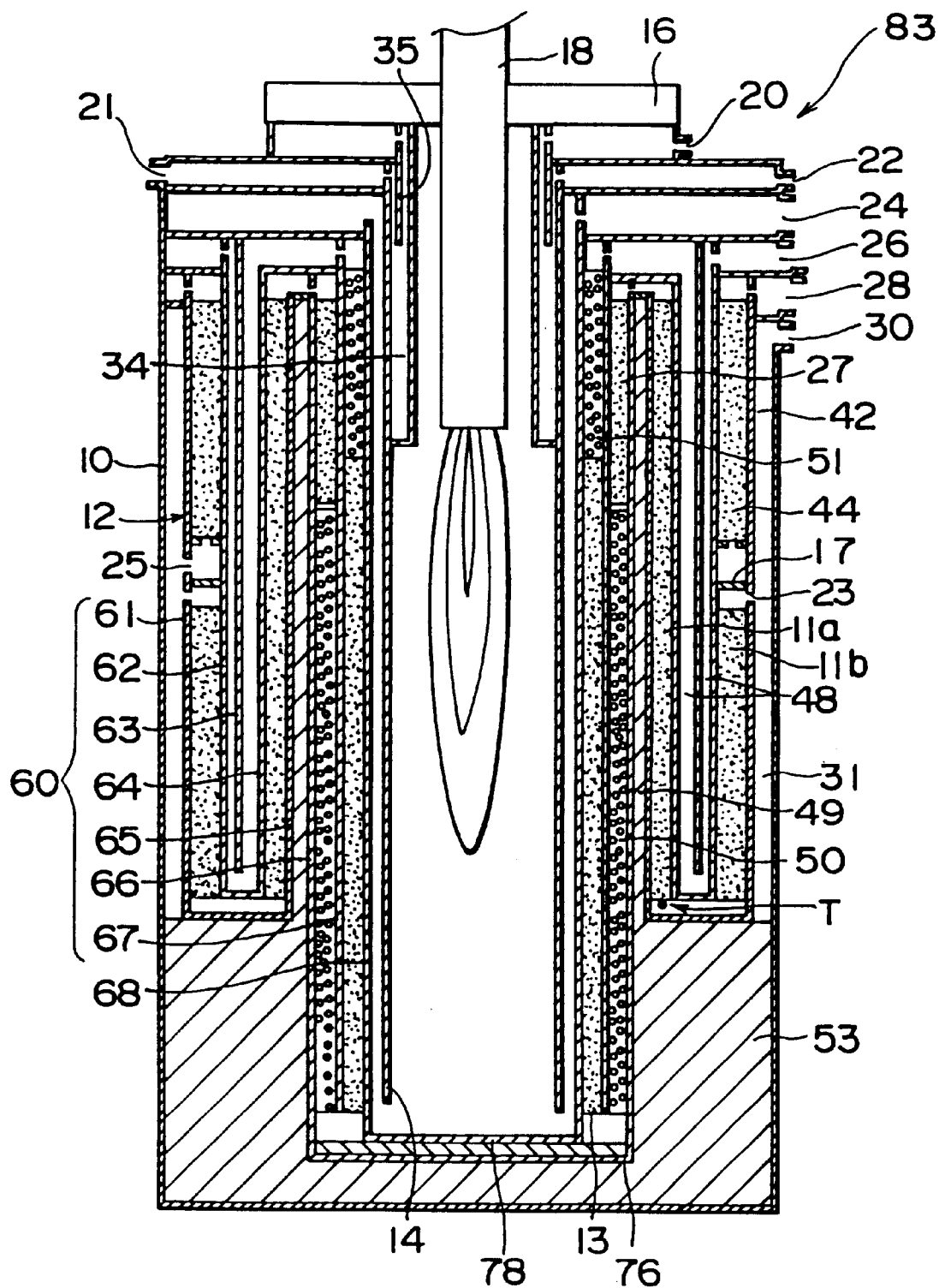
FIG. 7 is a longitudinal sectional view showing the schematic arrangement of a single-pipe cylinder type reformer according to the fourth embodiment of the present invention.

FIG. 7 shows still another example of the compact, lightweight, single-pipe cylinder type reformer of the present invention as the fourth embodiment of the present invention.

As shown in FIG. 7, in a reformer 83, a sub-shift layer 27 is formed on an upper portion (downstream side) of a heat recovery layer 50. A second shift layer 11b is also formed in an annular flow path on the outermost layer, and the shift layer 11b and a PROX layer 12 are separately formed on the outermost layer. The length of the annular flow path defined by a shift layer 11a and the PROX layer 12 and/or the second shift layer 11b in the axial direction is smaller than that of the heat recovery layer 50, and the lower end portions of these layers do not reach a portion near the bottom portion of an outer cylinder 10. In addition, the space between the outer cylinder 10 and a bottom plate 76, the space between the bottom plate 76 and a bottom plate 78, the space around the heat recovery layer 50, i.e., the space between a sixth inner cylinder 66 and the outer cylinder 10, and the space between the heat recovery layer 50 and a shift layer 11, i.e., the space between the sixth inner cylinder 66 and a fifth inner cylinder 65, are filled with a heat insulator 53.

In addition, a partition plate 17 is disposed in an annular flow path in the outermost layer formed between first and second inner cylinders 61 and 62, i.e., between the second shift layer 11b and the PROX layer 12, so the shift layer 11b and the PROX layer 12 are separated from each other by the partition plate 17. Eight outlets 23 are formed in the downstream outer wall of the shift layer 11b at almost equal intervals in the circumferential direction. One inlet 25 is formed in the upstream outer wall of the PROX layer 12 to oppose the position of a supply port 30 for PROX air.

The function of the reformer 83 will be described next.

Since the space between the outer cylinder 10 and the bottom plate 76 and the space between the bottom plate 76 and the bottom plate 78 are filled with the heat insulator, dissipation of heat from a portion near the bottom portion can be prevented to prevent an unnecessary heat loss from the reformer 83. This improves the thermal efficiency. In addition, since the space between the circumferential portion of the heat recovery layer 50 and the outer cylinder 10 and the space between the heat recovery layer 50 and the shift layer 11 are filled with the heat insulator, the transfer of heat from the heat recovery layer 50 can be prevented, and a heat loss in the heat recovery layer 50 can be reduced. This can also suppress a rise in the temperature of the shift layer 11 and maintain its temperature at a predetermined temperature. Note that the formation of the heat insulator 53 near the bottom portion is not limited to the above example and may be applied to the reformer 81 or 82 shown in FIG. 3 or 6.

Since the annular flow path defined by the shift layer 11a, second shift layer 11b, and the PROX layer 12 is shortened in the axial direction, the amount of heat transferred from the heat recovery layer 50 to the shift layer 11a and second shift layer 11b can be reduced, and the temperature of the shift layer which is likely to be overheated by the heat from the heat recovery layer 50 can be maintained at a proper temperature, thus preventing a decrease in CO conversion ratio in the shift layer.

Since the sub-shift layer 27 is formed on the upper portion of the heat recovery layer 50, i.e., the downstream side, a rise in the temperature of the sub-shift layer 27 can be quickened. Since the catalyst effect of the sub-shift layer 27 is quickly activated immediately after start-up operation, the starting time required for the reformer 83 can be shortened. A length for the sub-shift layer 27 is properly selected in accordance with a reduction in starting time by the formation of the sub-shift layer 27, the degree of overheating of the sub-shift layer 27 in a steady operation period, and the like.

In the above example, the sub-shift layer 27 is continuously formed on the upstream side of the shift layer 11a. However, the present invention is not limited to this arrangement. A single-pipe cylinder type reformer may be formed by using only the sub-shift layer 27, and a catalyst unit or the like having main shift layers and the like may be independently connected to the single-pipe cylinder type reformer. In this case as well, a rise in the temperature of the sub-shift layer 27 in the single-pipe cylinder type reformer is quickened, and a catalyst reaction in the sub-shift layer 27 can be caused at an early stage, thus shortening the starting time and the like.

The eight outlets 23 are formed in the downstream outer wall of the second shift layer 11b at almost equal intervals in the circumferential direction, and one inlet 25 is formed in the upstream outer wall of the PROX layer 12 to oppose the supply port 30 for PROX air. With this arrangement, a reformed gas passing through the second shift layer is discharged from the video signal processing/switching circuit 23 and merges with the air supplied from the air supply port 30 in a space 31. The reformed gas merging with the air is fed into the PROX layer 12 via the inlet 25.

Since the reformed gas passing through the shift layer 11 reliably merges with air, and only one inlet 25 is formed, the reformed gas and the air are sufficiently mixed when they are fed from the inlet 25. Since the reformed gas is fed into the PROX layer 12 after the gas and air are sufficiently agitated, a selective oxidizing reaction is efficiently performed. As a consequence, the amount of hydrogen consumed in the selective oxidizing reaction can be minimized to reduce the CO concentration to a predetermined value or less.

In the above example, the second shift layer 11b is formed on the lower portion of the PROX layer 12. However, the second shift layer 11b need not be formed on the lower portion of the PROX layer 12. In this case, a reformed gas passing through the shift layer 11a is discharged into the space 31 and agitated together with air. The gas is then fed into the PROX layer 12. Alternatively, the overall structure may be formed by the second shift layer 11 without forming the PROX layer 12. In this case, a unit or the like having a CO selective oxidizing function is connected to the above structure, as needed.

The heat insulator need not always be charged into all the portions described above. Charging of a heat insulator may be properly omitted in accordance with various conditions, e.g., the length of each portion of the reformer 83, operating temperature, and the intervals between the respective portions. In addition, the eight outlets 23 are formed at almost equal intervals in the circumferential direction, and one inlet 25 is formed. However, the present invention is not limited to this, and inlets may be formed at a plurality of positions.

What is claimed is:

1. A single-pipe cylinder type reformer characterized by comprising an upright outer circular cylinder, a circular cylinder concentrically located inside said outer cylinder at a distance in a radial direction, a plurality of circular intermediate cylinders concentrically located between said outer cylinder and said inner cylinder at distances from each other in the radial direction, a circular radiation cylinder concentrically located inside said inner cylinder at a distance in the radial direction, a burner fixed to one end portion of said reformer in an axial direction to be located in the center of the radiation cylinder in the radial direction, and a plurality of annular flow paths formed in laminar shapes in the radial direction between said inner cylinder and the innermost intermediate cylinder, between said adjacent intermediate cylinders, and between the outermost intermediate cylinder and said outer cylinder, said annular flow paths being at least partly filled with a reforming catalyst serving as a reforming catalyst layer and communicating with each other, comprising:

a heat recovery layer located in an annular flow path corresponding to an adjacent outer peripheral portion of said reforming catalyst layer so as to communicate with said reforming catalyst layer;

a CO converter catalyst layer located in an annular flow path on an outer peripheral side of said heat recovery layer;

a CO selective oxidizing catalyst layer and/or a second CO converter catalyst layer located in an annular flow path on an outer peripheral side of said CO converter catalyst layer so as to communicate with said CO converter catalyst layer; and a cooling fluid path which serves as a double annular flow path in the radial direction and allows a cooling fluid to pass, said cooling fluid path being formed by interposing one intermediate cylinder between said CO converter catalyst layer and said CO selective oxidizing catalyst layer and/or said second CO converter catalyst layer.

2. A single-pipe cylinder type reformer according to claim 1, characterized in that said heat recovery layer is filled with a filler having a representative length corresponding to ½ to ⅕ a width of said annular flow path to improve a heat transfer effect.

3. A single-pipe cylinder type reformer according to claim 1, characterized in that said reformer is cooled by passing any one of reforming water, a reformation material gas, and combustion air or a combination of at least two thereof in said cooling fluid path.

4. A single-pipe cylinder type reformer according to claim 1, characterized in that a double-bottom structure is formed by separating a bottom plate of said inner cylinder from a bottom plate of said intermediate cylinder forming an outer wall of said heat recovery layer.

5. A single-pipe cylinder type reformer according to claim 1, characterized in that spaces serving as heat insulating layers are formed between the intermediate cylinder forming the outer wall of said heat recovery layer and the intermediate cylinder forming an inner wall of said CO converter catalyst layer, and between a bottom plate of the intermediate cylinder forming the outer wall of said heat recovery layer and a bottom plate of the intermediate cylinder forming the inner wall of said CO converter catalyst layer.

6. A single-pipe cylinder type reformer according to claim 1, characterized in that an annular air path communicating with an air supply port on one side is formed between the outermost intermediate cylinder forming an outer wall of said CO selective oxidizing catalyst layer and said outer cylinder, a space communicating with the air path is formed between a bottom plate of the outermost intermediate cylinder forming the outer wall of said CO selective oxidizing catalyst layer and a bottom plate of said circular outer cylinder, and air inlets are formed in a side wall of the outermost intermediate cylinder forming the outer wall of said CO selective oxidizing catalyst layer and/or a bottom plate of the outermost intermediate cylinder to evenly supply air into said CO selective oxidizing catalyst layer.

7. A single-pipe cylinder type reformer according to claim 1, characterized in that said CO selective oxidizing catalyst layer comprises a CO-selective-oxidizing-catalyst-filled layer, and an air mixing layer formed on an upstream side of the CO-selective-oxidizing-catalyst-filled layer, and the air inlet is formed on an upstream side of the air mixing layer.

8. A single-pipe cylinder type reformer according to claim 7, characterized in that the air mixing layer is filled with a spreading promoting filler having a representative length of ⅓ to ¹⁄₁₀ a flow path width of the air mixing layer.

9. A single-pipe cylinder type reformer according to claim 1, characterized in that reforming water is fed into the cooling fluid path to absorb reaction heat in said CO converter catalyst layer and said CO selective oxidizing catalyst layer and/or said second CO converter catalyst layer, thereby heating and vaporizing the reforming water.

10. A single-pipe cylinder type reformer characterized by comprising an upright outer circular cylinder, a circular cylinder concentrically located inside said outer cylinder at a distance in a radial direction, a plurality of circular intermediate cylinders concentrically located between said outer cylinder and said inner cylinder at distances from each other in the radial direction, a circular radiation cylinder concentrically located inside said inner cylinder at a distance in the radial direction, a burner fixed to one end portion of said reformer in an axial direction to be located in the center of the radiation cylinder in the radial direction, and a plurality of annular flow paths formed in laminar shapes in the radial direction between said inner cylinder and the innermost intermediate cylinder, between said adjacent intermediate cylinders, and between the outermost intermediate cylinder and said outer cylinder, said annular flow paths being at least partly filled with a reforming catalyst serving as a reforming catalyst layer and communicating with each other, comprising:

- a steam generator formed on one side of said radiation cylinder and using said radiation cylinder as part of a heat transfer surface;
- a preheat layer formed on an upstream side of said reforming catalyst layer and functioning as a heat transfer promoting portion;
- a heat recovery layer located in an annular flow path corresponding to an adjacent outer peripheral portion of said reforming catalyst layer so as to communicate with said reforming catalyst layer;
- a CO converter catalyst layer located in an annular flow path on an outer peripheral side of said heat recovery layer;
- a CO selective oxidizing catalyst layer and/or a second CO converter catalyst layer located in an annular flow path on an outer peripheral side of said CO converter catalyst layer so as to communicate with said CO converter catalyst layer; and
- a cooling fluid path which is formed by interposing one intermediate cylinder between said CO converter catalyst layer and said CO selective oxidizing catalyst layer and/or said second CO transforming layer, serves as a double annular flow path in the radial direction, and allows a cooling fluid to pass.

11. A single-pipe cylinder type reformer according to claim 1, characterized in that at least one of annular spaces formed between a bottom plate of said outer cylinder and a bottom plate of the intermediate cylinder forming an outer wall of said heat recovery layer, between the intermediate cylinder forming the outer wall of said heat recovery layer and the outer cylinder, and between said intermediate cylinder forming the outer wall of said heat recovery layer and the intermediate cylinder forming an inner wall of said CO converter catalyst layer is filled with a heat insulator.

12. A single-pipe cylinder type reformer according to claim 1, characterized in that a sub-CO converter catalyst layer is formed on a downstream side of said heat recovery layer.

13. A single-pipe cylinder type reformer according to claim 1, characterized in that a length of the annular flow path including said CO converter catalyst layer, said cooling fluid path, and said CO selective oxidizing catalyst layer and/or said second CO converter catalyst layer in the axial direction is smaller than a length of the annular flow path including said reforming catalyst layer and said heat recovery layer in the axial direction.

14. A single-pipe cylinder type reformer according to claim 1, characterized in that an outermost annular flow path formed between said circular outer cylinder and the outermost intermediate cylinder is an air path, the air path communicates with the air supply port on one side, and outlet means which is formed in a side wall of said outermost intermediate cylinder throughout a circumferential direction such that a reformed gas passing through a second outer annular path formed between said outermost intermediate cylinder and the second outermost intermediate cylinder and located adjacent to the outermost annular flow path is temporarily discharged into the air path.

15. A single-pipe cylinder type reformer according to claim 14, characterized in that the second outer annular path is said CO selective oxidizing catalyst layer.

16. A single-pipe cylinder type reformer according to claim 15, characterized in that said reformer further comprises partition means disposed in the second outer annular path through a gap to divide said CO selective oxidizing catalyst layer into at least two layers near a downstream side of said outlet means in the axial direction, and an inlet formed in a side wall of said outermost intermediate cylinder and located near a downstream side of said partition means, and a reformed gas passing through said CO selective oxidizing catalyst layer on an upstream side is temporarily discharged from the outlet into the air path to merge with air in the air path, and the reformed gas mixed with the air is fed from the inlet into said CO selective oxidizing catalyst layer on a downstream side.

17. A single-pipe cylinder type reformer according to claim 14, characterized in that the annular path adjacent to said outermost annular path is said CO selective oxidizing catalyst layer and said second CO converter catalyst layer.

18. A single-pipe cylinder type reformer according to claim 17, characterized in that said reformer further comprises partition means disposed in the second outer annular path through a gap to separate said CO selective oxidizing catalyst layer from said second CO converter catalyst layer, and an inlet formed in a side wall of said outermost intermediate cylinder and located near a downstream side of said partition means, and a reformed gas passing through said second CO converter catalyst layer is temporarily discharged from the outlet into the air path to merge with air in the air path, and the reformed gas mixed with the air is fed from the inlet into the combined cycle power plant again.

19. A single-pipe cylinder type reformer according to claim 16, characterized in that the inlet is formed at only one position.

20. A single-pipe cylinder type reformer according to claim 19, characterized in that the inlet is formed on a side opposite to the air supply port in the radial direction of said reformer.

21. A single-pipe cylinder type reformer according to claim 11, characterized in that reforming water is fed into the cooling fluid path to absorb reaction heat in said CO converter catalyst layer and said CO selective oxidizing catalyst layer and/or said second CO converter catalyst layer, thereby heating and evaporating the reforming water.

22. A single-pipe cylinder type reformer according to any one of claim 1, characterized in that said single-pipe cylinder type reformer is used in combination with a polymer electrolyte fuel cell using said single-pipe cylinder type reformer.

23. A single-pipe cylinder type reformer according to claim 11, characterized in that said single-pipe cylinder type reformer is used in combination with a polymer electrolyte fuel cell using said single-pipe cylinder type reformer.

24. A method of operating a single-pipe cylinder type reformer including an upright outer circular cylinder, a circular cylinder concentrically located inside the outer cylinder at a distance in a radial direction, a plurality of circular intermediate cylinders concentrically located between the outer cylinder and the inner cylinder at distances from each other in the radial direction, a circular radiation cylinder concentrically located inside the inner cylinder at a distance in the radial direction, a burner fixed to one end portion of the reformer in an axial direction to be located in the center of the radiation cylinder in the radial direction, a plurality of annular flow paths formed between the inner cylinder and the innermost intermediate cylinder, between the adjacent intermediate cylinders, and between the outermost intermediate cylinder and the outer cylinder, the annular flow paths being at least partly filled with a reforming catalyst serving as a reforming catalyst layer and communicating with each other, a preheat layer formed on an upstream side of the reforming catalyst layer and functioning as a heat transfer promoting portion, a steam generator formed on one side of the radiation cylinder and using the radiation cylinder as part of a heat transfer surface, a heat recovery layer located in an annular flow path corresponding to an adjacent outer peripheral portion of the reforming catalyst layer so as to communicate with the reforming catalyst layer, a CO converter catalyst layer located in an annular flow path on an outer peripheral side of the heat recovery layer, a CO selective oxidizing catalyst layer and/or a second CO converter catalyst layer located in an annular flow path on an outer peripheral side of the CO converter catalyst layer so as to communicate with the CO converter catalyst layer, and a cooling fluid path which is formed by interposing one intermediate cylinder between said CO converter catalyst layer and said CO selective oxidizing catalyst layer and/or said second CO converter catalyst layer and serves as a double annular flow path in the radial direction, said cooling fluid path communicating with a reformation material gas inlet on one side to allow a reformation material gas as a cooling fluid, which is to be reformed, to pass and having a cooling fluid path communicating with said reforming catalyst layer on the other side, characterized by comprising:

the step of supplying saturated or superheated steam extracted from a saturated or superheated steam outlet of the steam generator, together with a reformation material gas, in start-up operation in which an internal temperature of the reformer is not more than a predetermined temperature;

the step of closing the saturated or superheated steam outlet and opening a wet steam outlet of the steam generator to supply wet steam together with a reformation material gas when the internal temperature exceeds the predetermined temperature; and the step of vaporizing the reforming water by absorbing reaction heat from the CO converter catalyst layer and/or the CO selective oxidizing catalyst layer in the cooling fluid path.

25. A method of operating a single-pipe cylinder type reformer according to claim 24, characterized in that opening/closing of the wet steam outlet is regulated in accordance with a variation in operation condition due to variation in load so as to maintain a temperature at an outlet of the CO converter catalyst layer and a temperature of the CO selective oxidizing catalyst layer and/or the second CO converter catalyst layer at a predetermined temperature.

* * * * *